United States Patent Office 3,104,250
Patented Sept. 17, 1963

3,104,250
GRIGNARD REACTIONS OF BIS(ARENE)METAL GRIGNARD REAGENTS
Harold H. Zeiss, Dayton, Ohio, assignor to Monsanto Chemical Company, St. Louis, Mo., a corporation of Delaware
No Drawing. Filed Apr. 1, 1957, Ser. No. 649,640
17 Claims. (Cl. 260—438)

The present invention is directed to the synthetically useful Grignard reactions of transition metal complexes containing two molecules of an aromatic compound at least one of which has a metallo halo substituent. The invention is further directed to such metal complexes, to the compounds resulting from the additive Grignard reactions thereof, and to the reduction products of these compounds. The invention is also directed to the process of preparing bis(arene)metal Grignard complexes, and then reacting such complexes in synthetically useful Grignard reactions.

In one aspect the invention is particularly directed to the synthetically useful Grignard reactions of bis(arene)-chromium complexes in which halomagnesium, or halochromium groups are substituted on at least one of the arene groups, to such chromium complexes, and to the products produced by the additive Grignard reactions thereof.

In another aspect, the invention is directed to the Grignard reaction of bis(arene)molybdenum compounds containing a halomagnesium or halomolybdenum substituents on at least one of the arene groups, to such bis-(arene)molybdenum complexes and to the products produced by the additive Grignard reactions thereof.

In another aspect the invention is directed to the Grignard reactions of bis(arene)tungsten compounds containing a halomagnesium or a halotungsten substituent on at least one of the arene groups.

In my copending application Serial No. 616,224 filed October 16, 1956, a method of preparing and isolating bis(arene)metal compounds, and the isolated bis(arene)-metal compounds are described and claimed. The preparative procedures of my copending application are applicable for preparing the Grignard-type metallo-organic complexes for use in the novel Grignard reactions of the present invention.

An object of the present invention is to provide bis-(arene)metal complexes of the "sandwich type" in which reactive functional groups are substituted in the arene moiety, e.g., such compounds as represented by:

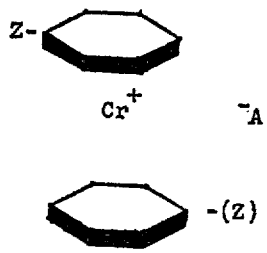

in which Z represents a functional group such as carboxyl or hydroxyl, or an organic radical containing such functional groups as carboxyl, hydroxyl, carbonyl, etc., (Z) represents the presence or absence of such groups or radicals in the second ring, and −A represents an anion. This object is considered to be achieved whether the above structure is an accurate representation of the spatial relationships of the atoms involved, or not; while the representation is considered accurate, the compounds are useful regardless of what the true configuration may be. Some procedures for preparing bis(arene)chromium compounds have recently been described in the literature by others. However, these published procedures do not make it possible to prepare bis(arene)metal compounds in which the arene groups contain reactive substituents. The present invention, by providing a method of preparing bis(arene)metal compounds containing reactive functional groups, makes it possible to use such bis-(arene)metal compounds as intermediates and reactants in the preparation of various types of monomeric and polymeric organic compounds containing chemically bonded metals.

The bis(arene)metal compounds of the present invention, e.g., the compounds represented by $$(Z\text{—}C_6H_5)_2Cr^+Cl^-$$

in which Z represents a reactive functional group or an organic radical containing such a group are believed to be complex molecular compounds in which the bonding of the benzene rings to the metal atom is by a type of delocalized and essentially covalent bond formed from π-electrons; while this type of compound may properly be referred to as a "complex compound" or "complex" it will ordinarily be designated herein as a "compound" in order to differentiate from the bis(arene)metal complexes of the type represented by $$[(C_6H_5MgBr)_2Cr^+Cl^-]$$

which will generally be referred to herein by such terms as "bis(arene)metal complexes" or "bis(arene) Grignard reagents."

The preparation of the bis(arene) Grignard reagents used in my new Grignard reaction is believed to involve first an oxidative-reductive step,

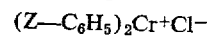

$$C_6H_5MgBr + CrCl_3 \rightarrow (C_6H_5)_2 + Cr^ICl + 2MgBrCl$$

and then co-ordinating-complexing step, such as,

$$2C_6H_5MgBr + Cr^ICl \longrightarrow (C_6H_5MgBr)_2Cr^ICl$$
(A)

to produce the complex, A. It is also possible that a small amount of the complex, B, is produced by the following reaction.

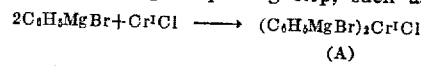

$$C_6H_5MgBr + CrCl_3 \longrightarrow C_6H_5CrCl_2 + MgBrCl \quad (a)$$
$$2C_6H_5CrCl_2 + Cr^ICl \longrightarrow (C_6H_5CrCl_2)_2Cr^ICl \quad (b)$$
(B)

However, regardless of whether the above equations are an accurate representation of the reaction which occurs, it is clear that the bis(arene)metal complex has the characteristics of a Grignard reagent and can be usefully employed in Grignard reactions in the manner taught herein. The presence of the type A complex as an intermediate in the production of bis(arene)chromium compounds is confirmed by the reactions with deuterium oxide hereinbelow, which unequivocally establish the presence of a hydrolyzable metallo halo group in each arene group of the bis(arene)metal complex.

The Grignard reactions of the present invention can be represented by the equation:

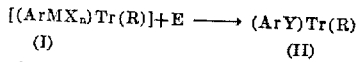

$$[(ArMX_n)Tr(R)] + E \longrightarrow (ArY)Tr(R)$$
(I)           (II)

in which Ar is a monovalent aromatic radical, the Grignard reagent of which is capable of existence and preparation, M is a transition metal or magnesium, X is a Grignard halogen, Tr is a transition metal, R is an aromatic group which can be the same as or different from $ArMX_n$, $n$ is an integer one less than the valence of the metal M, E is a compound other than I which is not a Grignard reagent but which is capable of undergoing a useful preparative reaction with a Grignard reagent, and Y is a reactive group substituted on Ar as a result of the reaction.

My invention is particularly directed to the Grignard addition reactions of Grignard type bis(arene)metal complexes, especially to reactions involving addition of the Grignard type complexes to carbon-to-oxygen double-bonds. Such reactions can be represented, for example, by the following equation:

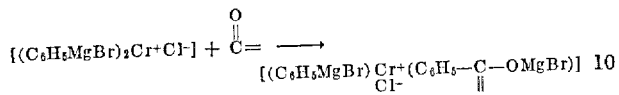

In which the two free-valences on the carbonyl carbon atom can represent one-double or two single bonds, and in which the

group can be a part of such compounds as carbon dioxide, formaldehyde or other aldehydes, ketones, esters, carboxylic acids, acid anhydrides, acid chlorides, acid salts, di-substituted amides, ketenes, isocyanates, etc. The intermediate halomagnesium alcoholate shown above can be hydrolyzed to give the

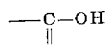

product, or, in some cases, depending upon the groups attached to the other valences on the alcoholate carbon-atom, can be further reacted with additional molecules of Grignard complex. Moreover, the reaction can be carried out so as to have the halomagnesium alcoholate groups formed on both arene groups rather than on only one. In some reactions it will be necessary to use more than an equimolar quantity of the bis-arene Grignard complex as one or more molar quantities will be destroyed in the reaction, as, for example, when the Grignard complex is reacted with a carboxylic acid. The following examples are illustrative of the novel Grignard reactions which can be conducted by adding bis(arene)-metal Grignard complexes to carbonyl bonds according to my invention, but it is obvious from my invention that the bis(arene)metal Grignard complexes can be used in many valuable Grignard reactions other than those illustrated.

In the following examples, the complexes resulting from reaction of C$_6$H$_5$MgBr and CrCl$_3$ will be used. In these illustrative reactions the complexes

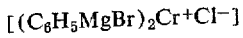

and

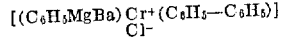

will be used, thus illustrating reactions with complexes in which both or only one of arene groups have a halo-metallo substituent. It will be realized, however, that the Grignard reactions are successful regardless of what the actual structure and constitution of the complexes may be, and it is desired to claim such reactions even if the above designations should not be accurate representations of the complexes. It will also be realized that complexes containing chromium in the zero valence state or with anions other than the chloride anion can be used in the following reactions and in Grignard reactions in general.

*Example 1*

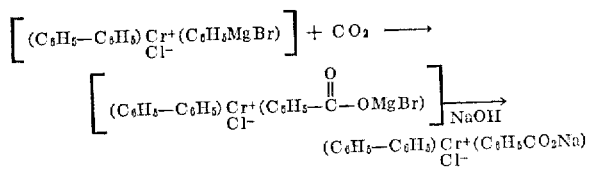

*Example 2*

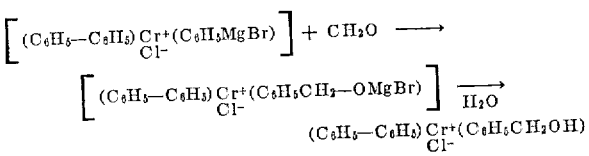

*Example 3*

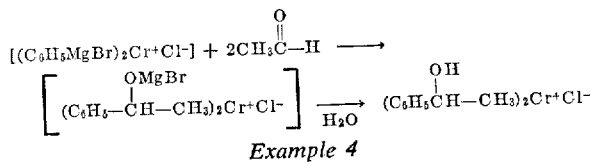

*Example 4*

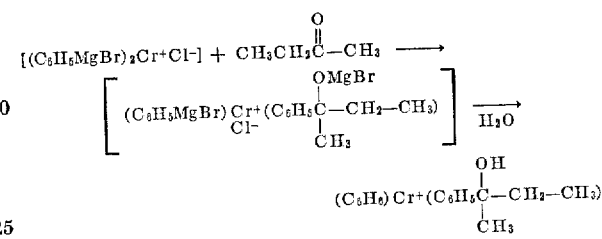

*Example 5*

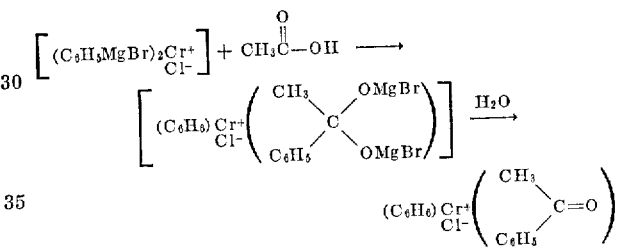

The acetophenone moiety will then react further with additional Grignard complex to produce a tertiary alcohol structure.

Esters can be used in place of the ketone in Example 4 to produce first ketones and then tertiary alcohols in similar manner, except that the formates, of course, result in aldehydes rather than ketones, and in secondary rather than tertiary alcohols. The use of ethyl carbonate can result in the production of tertiary alcohols in which all three radicals on the carbinol carbon atom are phenyl groups constituting part of bis(arene)chromium complexes.

*Example 6*

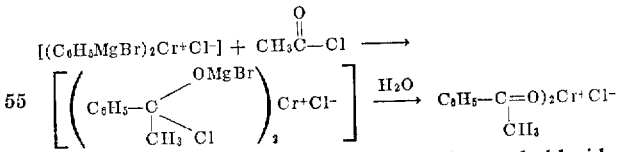

As reaction of the Grignard complex with acetyl chloride is much more rapid than any further reaction of the resulting acetophenone moieties with the Grignard complex, this type of reaction can often be stopped at the ketone stage by using reverse addition and excess acetyl chloride. In the case of some acid chlorides it may be desirable to have halo cadmium or halo zinc phenyl groups in the starting Grignard complexes in place of the halo magnesium phenyl groups, in order to make it easier to stop the reaction at the ketone stage.

*Example 7*

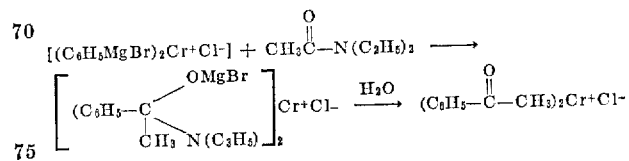

As can be seen from Example 7, the reaction of di-substituted amides with the Grignard complex will in general result in production of bis(arene)chromium compounds containing ketone, i.e., phenone groups. However, the use of formamides of this type will result in corresponding compounds containing aldehyde groups. The reaction of the bis(arene)chromium Grignard complexes with carbonyl compounds containing conjugated unsaturation, e.g., α,β-unsaturated aldehydes, ketones, and esters can take place by 1,2 addition or 1,4 addition. However, because the bis-arene Grignard complexes are essentially aromatic Grignard reagents, 1,2 addition is ordinarily favored, and the corresponding α,β-unsaturated alcohols are produced.

*Example 8*

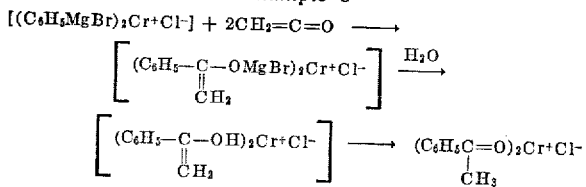

This invention is generally applicable to ketenes to prepare corresponding aldehydes.

*Example 9*

Isocyanates, e.g., $CH_3CH_2-N=C=O$, react in the manner of the ketenes in Example 7 to produce amides, e.g.,

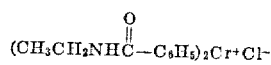

The bis(arene)chromium Grignard complexes are capable of reaction with unsaturated bonds other than the carbon-to-oxygen double bonds illustrated in the examples above. Similar reaction can be carried out with compounds containing carbon-to-sulfur double bonds, carbon-to-nitrogen double bonds, nitrogen-to-oxygen double bonds, and nitrogen-to-nitrogen double bonds.

*Example 10*

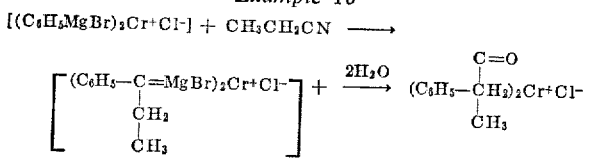

This procedure is generally applicable to primary aliphatic nitriles having more than two carbon atoms, and to aromatic nitriles that have no ortho substituents.

While addition reactions such as those illustrated above are ordinarily of most interest for preparative purposes, it is also possible to utilize the bis(arene)chromium Grignard complexes in other types of Grignard reactions, as illustrated by the following example.

*Example 11*

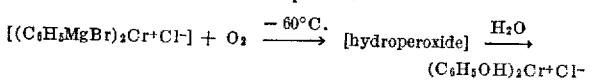

*Example 12*

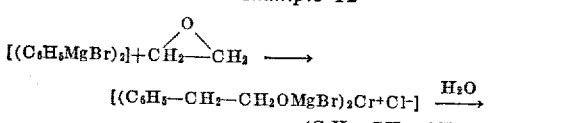

In this reaction propylene oxide can be substituted for the ethylene oxide to give the complex,

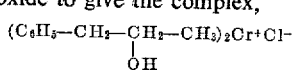

Other alkylene oxides can also be used, although the ethylene and propylene oxides are ordinarily the most useful.

The destructive reactions of the bis(arene)chromium Grignard complexes, i.e., the reactions in which the Grignard reagent is destroyed, in so far as they are novel, are considered to constitute part of the present invention. However, it will be realized that there is a fundamental difference between these destructive reactions of the type:

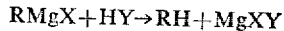

in which the organic part of the Grignard reagent is merely converted to a hydrocarbon, and those useful preparative reactions in which the Grignard reagent is condensed with another molecule and the organic part of the Grignard reagent becomes joined to some group or radical other than hydrogen, usually an organic group or radical. While the destructive reactions of Grignard reagents have some value in special cases, the present invention is mainly concerned with the introduction of functional groups, and the term "Grignard reaction" is used herein with respect to the useful additive or condensation reactions of the Grignard complexes. Moreover, the present invention is concerned with hetero-molecular Grignard reactions, i.e., with reactions between the Grignard complex and different molecules, rather than with coupling or similar reactions between two molecules of the same or different Grignard reagents. In order to differentiate useful Grignard reactions from other Grignard reactions, the terms "additive Grignard reactions," or "addition reaction" will be used generically in the description and claims, unless limited by context, to include, addition, condensation, oxidation, and other Grignard reactions in which the organic part of the Grignard complex becomes joined to a group other than hydrogen, and which do not constitute intermolecular coupling reactions of Grignard complexes.

While the above examples are sufficient to indicate the method of conducting the Grignard reactions of the bis(arene)metal Grignard complexes because the Grignard reaction is an old and well known procedure, the following examples are presented to illustrate in detail some of the more convenient procedures.

*Example 13*

Anhydrous chromic trichloride (3 g., 19 mmols) was added to 225 ml. of an ethereal solution of phenylmagnesium bromide (160 mmols) at −10° C. over a period of 2 hours and then allowed to stir for an additional 2 hours. With cooling (−10° C.) and stirring a slow stream of dry (Drierite and $P_2O_5$ towers) carbon dioxide was passed through the brown-black mixture. The temperature rose to 10° C. and a black oil formed. After several hours no further temperature effect of addition was observed, and all free $CO_2$ was swept from the system with dry $N_2$. A solution of 25 g. of sodium hydroxide in 150 ml. of water was added rapidly to the cool solution (−5° C.) and the temperature rose to 20° C. After stirring for 15 minutes the mixture was filtered with suction and the residue was washed on the filter with 200 ml. of alkaline solution. The combined filtrates were washed once with ether (original ether lost by gas entrainment) and twice with chloroform. The separated, alkaline layer was filtered again to give a clear, yellow solution which deposited a yellow precipitate when treated with 1.5 g. of sodium tetraphenylboron dissolved in a minimal quantity of water. This precipitate was washed thrice with water and then dried over $P_2O_5$ in vacuo at room temperature to give 1.7 g. dry solids. The filtrate and washings were still yellow.

A 0.5 g. portion of the dry solids was digested with 300 ml. of hot water, and the supernatant, yellow, neutral solution was filtered from the insoluble part (bis-benzenechromium[I] tetraphenylboron-IR identification). The solution was then treated with an aqueous solution of barium chloride which caused precipitation of its yellow salt. This salt was washed thrice with water and then dried at room temperature in vacuo over $P_2O_5$ to give 0.2 g.

product. IR spectrum of this product showed chromium "sandwich" structure and also carboxylate ion absorption at 6.24 and 7.3μ. This salt product is soluble in acetone and insoluble in water. Its analysis indicates it to be benzene-barium benzoate-chromium[I] tetraphenylboron contaminated with diphenyl-barium benzoate-chromium[I] tetraphenylboron.

*Analysis.*—Calcd. for

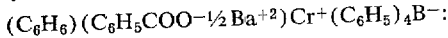

C, 69.5; H, 4.98; Cr, 8.13; Ba, 10.7. Found C, 70.3, 70.7, 71.1; H, 5.35, 5.32, 5.64; Cr, 7.99; Ba, 7.5.

The yelow filtrate above resulting from the precipitation with tetraphenylboron ion probably contained the sodium salt of bis-benzoic acid-chromium[I] whose tetraphenyl-boron salt is water-soluble. A greater amount of this dicarbonated product could be obtained by carbonating the Grignard product under pressure. The diphenyl-barium benzoate-chromium[I] tetraphenylboron could be produced by coupling of the intermediate in the following manner.

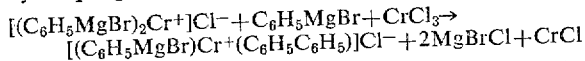

and reaction of carbon dioxide with the complex thereby produced, followed by the hydrolysis and salt-forming reactions.

*Example 14*

Reaction between 6 g. of chromic trichloride and phenylmagnesium bromide (0.3 mol) in 450 ml. of ether was carried out as described in Example 13. To the cold reaction mixture (−10°) was added slowly 20 ml. of 99.5% $D_2O$ drop by drop with vigorous stirring as the temperature rose to 5°. The cooling bath was removed and the temperature rose to 30°. The solution was recooled and a second portion of heavy water (10 ml.) was added, accompanied by a temperature rise to 0°. On adding a third increment of isotopic water (10 ml.) no rise in temperature was noted. The resultant mixture consisted of a yellow ether layer, a yellow-green water layer and a brown solid. The entire mixture was then diluted with 40 ml. of ordinary water and then acidified with 4 N sulfuric acid. The acidified mixture was then filtered, and the brown solid was washed with water until the filtrate was almost colorless. The residue was dissolved in chloroform and the orange solution was treated with 1 g. of sodium tetraphenylboron previously dissolved in ethanol-chloroform. Dilution of the mixture with ether caused the precipitation of 0.1 gram of orange-red flakes of bis-diphenylchromium tetraphenylboron whose infrared spectrum was the same as that of the salt prepared by the method of Fischer and Seus (E. O. Fischer and D. Seus, Chem. Ber., 89, 1809 (1956)).

The yellow-green water layer from the diluted and acidified reaction mixture was extracted 5 times with chloroform and then put aside (wide infra). This chloroform solution was then extracted 3 times with water and the chloroform was discarded. The yellow ether solution from the diluted and acidified reaction mixture above was now extracted with water until the ether was almost colorless and the ether was discarded. This water solution was extracted with chloroform 6 times and then combined with the water extracts above. (The chloroform extracts contained a small amount of the bis-phenylchromium cation.) To this orange-yellow aqueous solution, 3 grams of sodium tetraphenylboron in water was added to cause 3.4 gram of product, $[(C_6H_5D)(C_6H_5\!-\!C_6H_5)]Cr^+B\phi_4^-$, to precipitate for a yield of 15% of theory.

The green water layer put aside above was now treated with 1.5 gram of sodium tetraphenylboron in a small amount of water. Yellow plates, 2.0 gram (10% yield), of bis-monodeuterobenzenechromium tetraphenylboron were obtained. This salt was recrystallized from acetone.

One gram of bis-monodeuterobenzenechromium tetraphenylboron was dissolved in 300 ml. of acetone and then boiled with a solution of 10 ml. of concentrated hydrochloric acid in 40 ml. of water. After 1 hour the clear solution was treated with 4 grams of sodium hydroxide, filtered and then brought to complete basicity with an additional 8 grams of the same base. The yellow alkaline solution was now transferred to a separatory funnel and kept under nitrogen while being reduced with a solution of 8 grams of sodium dithionate and 6 grams of sodium hydroxide in water. After shaking for several minutes the solution deposited brown flakes of bis-monodeuterobenzenechromium[0]. This product was taken up on benzene, dried over solid potassium hydroxide and isolated by the removal of the solvent in vacuo, 0.21 gram (50% yield). This powder was then sublimed at 150/20 mm. to give long, black, feathery needles, M.P. 282–284° C. The infrared spectrum of this deuterated substance differs from that of the bis-benzenechromium[0] compounds in having characteristic C—D stretching absorption at 2269 cm.$^{-1}$ (4.42μ) and a modified "fingerprint" region. [Raman and infrared spectra of the deuterated benzenes have been reported in detail by C. R. Bailey et al., J. Chem. Soc. 299 (1946).]

The infrared spectrum of the thermal decomposition products of the compounds was then obtained by the following procedure. A 5 cm. gas infrared cell with sodium chloride windows was evacuated to less than 1 mm. pressure. Pure benzene vapor was then admitted until the cell pressure was 100 mm. and the vapor spectrum was then recorded in a Baird spectrophotometer. A 75 mg. sample of bis-benzenechromium[0] was then pyrolyzed between 250–300° directly into the same evacuated cell and the spectrum of its vapor was recorded. Finally, 38 mg. of bis-monodeuterobenzenechromium[0] was decomposed in the same way and the spectrum of its vapor was recorded. Metallic chromium and monodeuterobenzene containing a small amount of benzene were indicated to be the sole products from the decomposition of the deuterated compound (the benzene is believed to arise from the trace of water present in the deuterium oxide (99.5% pure) and from moisture contamination during the reaction). The bis-benzenechromium[0] was decomposed into chromium and pure benzene. Thus the presence and location of the deuterium in the benzene rings of the bis-monodeuterobenzenechromium[0] complex is unequivocally demonstrated and the complex, $[C_6H_5MgBr]_2Cr^IC1$, is clearly established as an intermediate.

*Example 15*

A bis(arene) Grignard reagent was prepared by reacting 0.3 mol of phenylmagnesium bromide and 6 grams of chromic trichloride in 450 ml. of ether according to the procedure of Example 13. Formaldehyde was passed through the vigorously stirred ether solution of the Grignard complex by means of a dry nitrogen stream. The formaldehyde was generated by heating forty grams of paraldehyde (previously dried over $P_2O_5$) and condensing the gas in a Schlenk tube at −70° C. to a clear colorless liquid. This liquid was maintained at −10° C. to provide a continuous stream of formaldehyde gas to be passed into the reactor with nitrogen; the gas was passed through two traps maintained at −12° C. to remove last traces of moisture prior to entering the reactor. The temperature of the ether solution at the start of the reaction was −8° C., and it rose to 15° C. during the reaction as a thick, viscous, black-brown product formed below the yellow ether layer. Addition was stopped after about one hour when no further reaction was observed, but stirring was continued for an additional hour.

Starting at a temperature of 0° C., the reaction mixture was slowly hydrolyzed under nitrogen by addition of 200 ml. of water as the temperature rose to 20° C., and an ocher-brown mixture was produced. This mixture was stirred for one hour, and then filtered at the water pump. The insoluble material was extracted with water and the water solutions were combined with the aqueous filtrate. The ether filtrate layer was likewise extracted with water, and this water solution was combined with the others, and the ether layer was discarded. The orange-yellow aqueous solution of products was first extracted with chloroform, and was then treated with sodium tetraphenylboron to precipitate 5.6 grams of tetraphenylboron salts. The crystalline precipitae was slurried in methanol and the insoluble bis-benzenechromium tetraphenylboron was removed by filtration (identification by infrared comparison and by crystal structure). On cooling the filtrate, an initial crop of crude precipitate was obtained. The methanol mother liquor was concentrated and again cooled to give a crop of nicely crystalline, yellow laminae which appeared to be homogeneous. Infrared examination and analysis indicated this to be the desired benzyl alcohol-benzenechromium tetraphenylboron $(C_6H_6)(C_6H_5CH_2OH)Cr^+B(C_6H_5)_4^-$.

*Analysis.*—Calcd. for $C_{37}H_{34}OBCr$: C, 79.72; H, 6.14; active H (Zerewitinoff), 0.18. Found: C, 79.72; H, 6.82; active H, 0.23, 0.25.

The corresponding bis-benzyl alcohol-chromium compound could be obtained by use of more vigorous reaction conditions, higher concentration of formaldehyde (under pressure), longer reaction period, higher reaction temperature, etc. While the above reaction and isolation procedure produced the desired compound, it will be realized now that the reaction has been shown to occur, that other Grignard reaction procedures can be applied in the process and different procedures can be devised for the isolation of the product.

It will be understood that in each of the above examples and in general the chromium can be replaced by tungsten or molybdenum, and corresponding bis(arene)-tungsten and bis(arene)molybdenum compounds will be produced and will have valuable properties and uses the same as or similar to those of the bis(arene)chromium compounds. The transition metals, particularly those of group VI having an atomic number no greater than 74, are recognized as having similar properties. Group VI transition metals are those elements in group VI–B of the periodic chart of the elements (Lange's Handbook of Chemistry, sixth edition, page 58). The Grignard reaction can also be applied to the bis(arene)metal Grignard complexes of other transition metals, e.g., to such complexes of nickel, manganese and cobalt.

The process of the present invention is applicable to any bis(arene)metal Grignard complex; such complexes can be prepared from any aryl Grignard reagents capable of preparation and stable existence, which, in effect, means that the bis(arene)metal Grignard complexes can be prepared from any aryl halogen compounds capable of forming a Grignard reagent in the normal manner. As examples of such aryl halogen compounds, the following can be named:

Phenyl bromide
1,4-dibromobenzene
1,2-dibromobenzene
p-Bromotoluene
p-Iodotoluene
p-Bromostyrene
p-Bromo-α-methylstyrene
Bromomesitylene
Phenyl chloride
α-Bromonaphthalene
β-Bromonaphthalene
α-Bromoanthracene
β-Bromophenanthrene
p-Diethylaminobromobenzene m-Bromotoluene
o-Bromotoluene
1-bromo-4-chlorobenzene
α-Bromotetralin
Pentamethylbromobenzene
m-Fluorobromobenzene
p-Ethylbromobenzene
p-Butylbromobenzene
p-Isobutylbromobenzene
p-Sec-butylbromobenzene
p-t-Butylbromobenzene
p-Hexylbromobenzene
p-Phenylbromobenzene, etc.

It will be apparent from the above compounds that the bis(arene)metal Grignard complexes can be prepared from halogenated aryl hydrocarbons and other aryl halogen compounds which do not contain active hydrogen atoms, unsaturated carbon to oxygen bonds, or other functional groups capable of destroying or reacting with Grignard reagents.

While dihalogen compounds are capable of forming di-Grignard compounds, the formation of the Grignard reagent from such compounds can be conducted to cause Grignardization of only one halogen group. Both the mono- and di-Grignard aryl compounds are useful in forming bis(arene)metal Grignard complexes for use in the present invention.

While the use of bis(arene)metal Grignard complexes in which the arene groups have substituents other than metallo halo substituents is part of the present invention, it is not ordinarily necessary or desirable to have such other substituents, as the present inventive process produces the type of functional groups desired for further reactions and uses. However, such other substituents can be present and their presence will have value in special cases.

As the Grignard halogen in the bis(arene)metal Grignard complexes, bromine is preferred, but iodine and chlorine are also useful, although in the formation of aryl magnesium chlorides to prepare such complexes rather vigorous reaction conditions are sometimes required. The aryl fluorides can theoretically be used in the preparation of Grignard reagents and therefore fluorine could be used as the Grignard halogen in the present process; however, as the aryl fluorides are usually less reactive than other aryl halides in the preparation of Grignard reagents, the use of fluorides in the present process is ordinarily impractical.

The above-named halogen compounds are transformed to the corresponding bis(arene)metal Grignard complexes for use in the present process. A few examples of the aromatic radicals which constitute the organic part of the arene groups in such complexes are:

Phenyl
$C_6H_5$—$C_6H_4$—
p-Chlorophenyl
p-Sec-butylphenyl
p-Vinylphenyl
2,4-divinylphenyl
α-Naphthyl, etc.

It is generally preferred that the arene groups be monocyclic, although dicyclic and polycyclic groups can constitute the organic portion of the arene groups, and such polycyclic groups are sometimes produced even when the aryl Grignard reagent is monocyclic.

In preparing the bis(arene)metal Grignard complexes for use in the present novel Grignard reaction, aryl Grignard reagents are reacted with a Group VI metal halogen compound. This reaction can take place under the usual conditions for Grignard reactions. It is necessary, of course, to exclude air and moisture in order to avoid destruction of the Grignard reagents. The normal Grignard solvents or diluents, e.g., ethers, dioxane, benzene, toluene, diethyl Cellosolve (diethyl ether of ethylene glycol), tetrahydrofuran, tertiary amines, etc., can be used in the reaction. Solvents which unduly interfere with or retard the reactions, e.g., $CCl_4$, should be avoided. The reaction is ordinarily conducted at low temperatures, e.g., from the temperature of Dry Ice to 0° C., to insure against decomposition of the product. However, higher temperatures, e.g., up to room temperature (20° C.) or higher can be used.

Of the chromium halides for use in preparing the Grignard complex, chromyl chloride is very suitable when oxidizable groups, e.g., vinyl, are absent. Anhydrous chromic chloride also works very well. Other chromous and chromic halides, can also be used, particularly the bromides, iodides, and chlorides; for reasons of economy the chlorides will ordinarily be employed e.g., $CrCl_2$, $CrCl_3$, and $CrO_2Cl_2$. The chromium compounds must be anhydrous to avoid undue destruction of the Grignard reagent.

The bis(arene)molybdenum and bis(arene)tungsten complexes for use in my novel Grignard reactions are prepared by reacting halides of the metals, e.g., molybdenum pentachloride, molybdenum tribromide, or tungsten hexaphenolate with aryl Grignard reagents or aryl lithium compounds. It is also possible to utilize tungsten hexaphenolate in place of a tungsten halide. It will be appreciated that the preparation of bis(arene)metal Grignard complexes, a mixture of such complexes containing various arene groups will often be obtained. For example, when $C_6H_5MgBr$ is the Grignard reagent reacted with $CrCl_3$, the resulting complex may contain such arene groups as $C_6H_5MgBr$, $C_6H_5CrCl_2$, $(C_6H_5)_2CrCl$, $C_6H_5$—$C_6H_5MgBr$, $C_6H_5$—$C_6H_4$—$CrCl_2$, $C_6H_5$—$C_6H_5$, etc., and mixtures of the same. In such cases, the mixture of complexes can be used in a Grignard reaction, and the various products can be separated at a later stage; at times however, it may be desirable to separate the various complexes according to their aryl radicals, and to conduct the Grignard reaction with individual complexes containing metallo halo substitution in the arene groups. While the Grignard complex will not ordinarily contain the group $C_6H_6$, the group $C_6H_5MgBr$ is easily convertible thereto, by hydrolysis or otherwise, thereby making it possible to convert such complex cations as $(C_6H_5MgBr)_2Cr^+$ to $(C_6H_5MgBr)Cr^+(C_6H_6)$ by partial hydrolysis or other selective procedures; of course, the latter cation will then take part in the Grignard reactions of this invention to produce such cations as $$(C_6H_5—Z)Cr^+(C_6H_6)$$

Z representing a functional group or a radical containing a functional group.

It is ordinarily convenient to carry out the Grignard reaction upon whatever salt is obtained in the preparation of the Grignard complex, e.g., the chloride salt in the case of $$(C_6H_5MgBr)_2Cr^+Cl^-$$

However, it will be appreciated that other salt anions can readily be substituted for the chloride ion, and that the resulting salts can be used in the Grignard reactions described herein.

In the preparation of bis(arene)metal Grignard complexes, an excess of Grignard reagent is generally used. Such excess can vary considerably, for example, from 5 to 10 moles of Grignard reagent for each mole of chromyl chloride. In general, from about 2 up to 15 moles of Grignard reagent are used per mole of chromium halogen compound. For example, about 5 moles of aryl Grignard reagent can be used for each mole of chromium trichloride. Similar ranges of other metal halides can be used.

Further procedures for the preparation of bis(arene)-metal Grignard complexes can be found in my copending application Serial No. 616,224. In addition, the many published procedures of Hein directed to the preparation of polyphenylchromium compounds can be adapted to the preparation of bis(arene)metal Grignard complexes for use in my novel Grignard reactions.

A few representative examples of the bis(arene)metal compounds which are provided by the present invention are such compounds as bis(benzene)$Cr^+Cl^-$ compounds in which one or both of the benzene groups contains one of the following substituents.

A. A carboxyl group:
—COOH
—COOM in which M can be any salt forming cation.
—COOR in which R is an aliphatic, aryl, alkaryl, aralkyl, cycloaliphatic or heterocyclic radical, and and preferably a hydrocarbon of no more than eight carbon atoms.

B. A carbinol:
—CH$_2$OH
—CHROH in which R is defined as above.
—CRR'OH in which R and R' can be the same or different and are equal to R as defined above.

C. A carbonyl group:

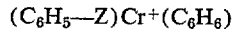

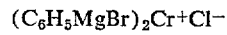

in which R is defined as above.

The R's and R''s in the carbinols will depend upon the aldehydes and ketones used in preparing the carbinols, and can be those resulting from any of the aldehydes or ketones described above, or any other aldehydes and ketones capable of undergoing a Grignard reaction. It will be noted that the tertiary alcohols can also result from reaction of other types of organic compounds given in the examples above. The R in the carbonyl group depends upon the acid halide or other compound used in preparing the carbonyl compound.

It will be understood that the chloride anion in the above bis(benzene)chromium salts can be replaced by other anions, for example, $I^-$, tetraphenylboron$^-$, the picrate anion, $[Cr(CNS)_4(NH_3)_2]^-$, $ClO_4^-$, etc. In fact, salts of several of the named anions are useful in separation procedures. The salts of the novel bis(arene)-metal compounds can be formed with anions of organic and inorganic acids, usually by reacting a salt of the chosen acid with a bis(arene)metal salt. In addition to the above-named anions, such anions as $SO_4^=$, $HSO_4^-$, $CH_3COO^-$, $C_6H_5COO^-$, etc. are applicable.

The novel bis(arene)metal salts in which the arene group contains reactive substituents, can be converted to corresponding compounds in which the metal is in the zero-valence state by reduction procedures. A good reduction procedure is agitation of the salt suspended in a mixture of benzene or other organic solvent, and 50% aqueous hypophosphorus acid. The use of benzene and alkaline hydrosulfite is also effective. Other chemical reducing agents can be used, and electrolytic procedures are also applicable. Applicable reduction procedures are described in more detail in my copending application Serial No. 616,224. In using the reduction procedures, it is, of course, necessary to select procedures which do not reduce or otherwise interfere with the reactive substituent in the arene ring, unless it is desired to alter that substituent. For example, the $S_2O_4^=$ ion can be used to reduce $$(C_6H_5COONa)Cr^+(C_6H_6) \text{ to } (C_6H_5COONa)Cr^0(C_6H_6)$$

Both the salt compounds and the compounds in which the metal has no ionic charge are generally contemplated herein by the terms "bis(arene)metal compound" and "bis(arene)chromium compound," as the salts can readily be reduced to the zero-valent metal compounds, and the two forms have similar uses and properties.

The novel bis(arene)metal compounds illustrated in the examples above can be further treated in various ways to obtain modifications having various properties and uses, e.g., those compounds containing alcoholic groups can be dehydrated to vinyl compounds as illustrated below:

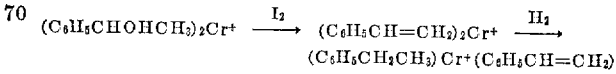

Both the mono- and the di-vinyl compounds will be useful in the preparation of polymers. The mono-vinyl compound, for example, can be used either alone, or mixed with styrene to prepared polystyrene type polymers, or the mono-vinyl compound, alone or with styrene monomer, can be copolymerized with 1,4-butadiene to prepare modified butadiene-styrene rubbers, e.g., modified GR-S type rubbers.

It is apparent from the general description and the examples set forth herein that the objects of the invention have been achieved, i.e., a general method for incorporating reactive functional groups into bis(arene)metal compounds has been discovered and described. In my copending application Serial No. 616,224, there is described a method for obtaining bis(styrene)chromium compounds; however, the method there described is not generally applicable to the introduction of functional groups into bis(arene)metal compounds.

It can be seen from the examples that the normal Grignard procedure involves an addition of the compound to be Grignardized to a solution of the bis(arene)metal Grignard complex in a solvent for the Grignard reaction, e.g., an ether solvent, usually starting at a lower temperature, e.g., below 10° C., usually at −10° C. or lower, followed by an additional reaction period to complete the reaction, either at room temperature or with heating to higher temperatures, e.g., 50 or 60° C. However, it would be possible in many cases to conduct the entire reaction at room temperature, although yields would probably be lower. The reaction is usually followed by a hydrolysis procedure. The hydrolysis is ordinarily conducted at low temperatures and with cooling, as can conveniently be done by adding ice as the hydrolysis medium. Following the hydrolysis, a little dilute acid, e.g., such acids or acid salts as hydrochloric acid, sulfuric acid, phosphoric acid, or ammonium chloride, is added to the reaction medium to decompose the metal hydroxides formed during the hydrolysis procedure. If desired, the addition of the acid can be combined with the hydrolysis procedure. In some cases it will be desirable to add alkali to the product in place of acid, e.g., when the product is an acid and it is desired to obtain it in the form of an alkali metal salt for isolation purposes. Although my novel Grignard reactions can be conducted without a solvent for the reactants, it is generally desirable to carry out the reaction in a Grignard solvent. Any Grignard solvents are applicable, e.g., those named hereinabove in regards to the preparation of the bis(arene)metal Grignard complexes. The Grignard reactions of the bis(arene)metal complexes can be varied and modified in many ways utilizing the principles and procedures for carrying out our Grignard reactions in general and with other particular reactants which are known to the art. For example, Kharasch and Reinmuth, Grignard Reactions of Nonmetallic Substances (Prentice-Hall Inc., New York, 1954), set forth many of the known Grignard procedures; the classical procedures discussed on pages 143 and 144 therein can be applied in my new process, and it is similarly possible to use the other procedures and principles taught therein in my process. Gilman, Organic Chemistry, vol. I, 2d ed., pp. 495 ff. (John Wiley & Sons Inc., New York), similarly teaches Grignard reactions by which my invention can be carried out.

While the isolation procedures for the bis(arene)metal products will vary somewhat, depending upon the solubility and stability of the said products, the proper procedures for isolation of the various bis(arene)metal compounds will be obvious to those skilled in the art now that they have been apprised of the existence and methods of preparation of such compounds. In general it can be stated that chloroform extraction can be used to separate compounds in what the arene groups are diphenyl or similar polycyclic moieties, that ether extraction can be used when the compound has both monocyclic and polycyclic arene groups, and that when the compound contains only monocyclic arene groups, water extraction is indicated. Of course, the functional groups on the arene moieties are also important; for example, the carboxyl groups form water-soluble alkali metal salts, and water-insoluble barium salts. The bis(arene)metal compounds can often be precipitated from solution by formation of such insoluble salts as tetraphenyl borons, picrates, etc. However, when the compounds contain solubilizing functional groups, it may, in some cases, be necessary to convert such functional groups to other forms, e.g., as by converting an alkali carboxy group to a barium carboxy group in order to precipitate the compound. In some cases, the products can be recovered by extraction, followed by evaporation of the extracting medium. When the bis(arene)metal compounds are obtained in the form of a salt, the salts can readily be converted to the corresponding compounds in which the metal has an ionic valence of zero by the use of appropriate reduction procedures; it is only necessary to select reduction procedures which will reduce the valence of the metal to zero, without also reducing the functional groups in the arene moieties, unless, of course, it is also desired to reduce such functional groups.

The normal Grignard reaction conditions can be used in general in the reactions set forth in the examples above. In such reactions it is customary to have a slight excess of the Grignard reagent over the molar amount, although other amounts, e.g., from equimolar amounts to a 100% excess of Grignard reagent can be used. However, when an intermediate compound is subject to further reaction with Grignard reagent and it is desired to stop the reaction at the intermediate phase, as in the case of introduction of keto-groups by reaction with acid chlorides, as in Example 6 above, it is advisable to use an excess of the other organic reactant (acid chloride) and to use a reverse addition, i.e., to add the Grignard reagent to the other organic reactant. The general Grignard conditions for preparation of ketones from acid chlorides are disclosed by Kharasch and Reinmuth supra, page 79, and those principles and procedures can be used in the present process for the preparation of

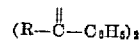

metal compounds, in which R represents an organic radical, preferably an aryl or aliphatic hydrocarbon radical of up to 8 carbon atoms.

The bis(arene)metal Grignard complexes can be carbonated by any method which is suitable for carbonating Grignard reagents. The preferred procedures are treatment with carbon dioxide gas, treatment with carbon dioxide gas under pressure, and treatment with Dry Ice (solid $CO_2$).

Among the most useful organic compounds to be reacted with bis(arene)metal Grignard complexes according to my invention are the aldehydes and ketones.

A great variety of the aldehydes are available and can be used, including aldehydes containing various groups such as aliphatic, cycloaliphatic, alkaryl, aralkyl, heterocyclic and aromatic groups, as illustrated by the following examples:

Formaldehyde
Acetaldehyde
Propionaldehyde
Benzaldehyde
2-phenylacetaldehyde
Furfural
n-Butyraldehyde
Hexaldehyde
Cyclohexanecarboxaldehyde
Iso-butyraldehyde
p-Tolualdehyde
a-Naphthaldehyde
3-Pyridinecarboxaldehyde Innumerable ketones can be used in my novel Grignard reaction, including aliphatic, cycloaliphatic, heterocyclic, di-aryl, aryl alkyl, etc., ketones as illustrated by the following examples:

Acetone
Methyl ethyl ketone
Diethyl ketone
Diisobutyl ketone
n-Hexan-2-one
Diphenyl ketone
Phenyl p-tolyl ketone
Acetophenone
Cyclohexanone
Cyclopentanone
2-methylcyclopentanone
Cyclohexyl methyl ketone
1,5-dimethyl pyrrolone, etc.

The Grignard reaction is known to be generally applicable to aldehydes and ketones, and, in view of the present disclosure numerous other aldehydes and ketones which can be used in my novel Grignard reaction will be apparent to the organic chemist. Further examples of such applicable aldehydes and ketones are found in the hundreds of aldehydes and ketones listed in Kharasch and Reinmuth (referred to above) as undergoing Grignard reactions.

It will be understood that the aldehydes and ketones given by way of example above can be used in Grignard reactions in general with bis(arene)metal Grignard complexes, and any one of the aldehydes or ketones can be reacted with any one of the bis(arene)metal Grignard complexes given by way of example herein.

Among the most useful aldehydes and ketones for my Grignard reaction are the alkanols and alkanones, i.e., the oxoalkanes, particularly those having 1 to 8 carbon atoms.

It does not appear necessary to give numerous specific examples of the acid anhydrides, acid chlorides, ketenes, nitriles, isocyanates, esters, di-substituted amides, etc., as the Grignard reaction is known to be generally applicable to such compounds and numerous examples can be found in organic chemistry reference books, for example, the Kharasch and Reinmuth or Gilman references cited above. Moreover, the types of groups present in such compounds correspond to those illustrated for the aldehydes and ketones.

The bis(arene)metal compounds containing reactive functional groups have valuable utility as intermediate organic compounds. For example, the compounds containing a carboxyl group, e.g., $$[(C_6H_6)Cr^+(C_6H_5CO_2H)]Cl^-$$

can be used to esterify the end groups of alkyd resins or other polyesters prepared from reactions of polycarboxylic acids and polyhydric alcohols, particularly those polyesters prepared with such dicarboxylic acids as phthalic acid or adipic acid, and dihydric alcohols, such as ethylene glycol, or polyethylene glycols, in which a slight excess of the glycol has been used and which have hydroxyl end groups for reaction with the carboxyl group of the carboxyl containing bis(arene)chromium compound; the latter compound can be reacted with the previously prepared polyester, or it can be added to the dicarboxylic acid and dihydric alcohol reactants prior to formation of the polyester. The resulting polyester can be used for ordinary coating and molding procedures particularly low temperature molding procedures, for which polyester and alkyd resins are used, and the resulting coatings and moldings will have desirable "antistatic" properties due to the presence of the chromium in the molecular structure of the polyesters. Various amounts of the carboxyl-containing bis(arene) chromium compound, such as up to 5% by weight based upon the dicarboxylic acid, e.g., 2 to 3% by weight, can be used, although amounts up to 10% or more may be advantageous at times. In the case of a bis(arene)metal compound containing two carboxyl groups, e.g., $$bis(C_6H_5COOH)_2Cr$$

the said bis(arene)metal compound can be used to replace all or part of the dicarboxylic acid used in polyester formation, and the resulting resins will be useful for ordinary coating and other resin uses, and their particular electrostatic, magnetic, electrical and biological properties will make them especially valuable for such ordinary purposes, as well as making them suitable for a number of specialized uses. It will be realized that the carboxylic acid esters, acid chlorides, etc., of both the carboxyl containing bis(arene)metal compounds and the polycarboxylic acids in general can be used in place of the free acids in the formation of the polyesters; in fact, the methyl esters are often used in the preparation of polyesters. The novel polyesters are prepared by heating the reactants to temperatures of around 200° C., either with or without catalyst, until the polyester is formed. The bis(aryl-COOH)chromium compounds can be reacted with polyamines, particularly diamines such as hexamethylene diamine, to prepare long chain polyamides of the "nylon" type with chromium atoms chemically bonded in the molecular structure. In such polymers it will often be desirable to use such dicarboxylic acids as phthalic acid, adipic acid, terephthalic acid, or mixtures of such acids, for the bulk of the polycarboxylic acid, and to use only a small amount of the bis(aryl-COOH) chromium compound to modify the properties of the polymer. The resulting polymers will have their usual fiber-forming and molding properties, and will also have valuable electrostatic and other electrical properties due to the presence of the chromium. For the preparation of the polyamides, the carboxyl groups can be in the form of free carboxyl groups, metal salt groups, acid chlorides, esters, etc.

It will also be possible to prepare polymers from the bis(arene)metal compound in many other ways, e.g., salt polymers can be formed by the reaction $$(ArCOO^-M^+)_2Tr^+X^- + M'X'_n \rightarrow \text{salt polymer}$$

in which M is an alkali metal or hydrogen, Tr is a transition metal, X and X' are anions, M' is a metal cation of valence 2, 3 or 4, and $n$ is a number designating the proper numerical relationship between M' and X' to provide a salt with a valence of zero. Moreover, pyrolysis of such salts, e.g.,

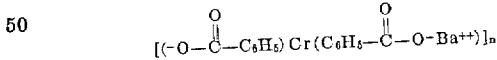

will lead to polymeric ketones,

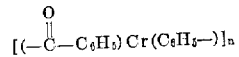

$n$ representing a large integer.

It will also be appreciated that the preparation of bis(arene)metal compounds containing different types of functional groups in the same molecule is contemplated in the present invention, and that such compounds are useful in forming polymers and in other reactions. An example of this type of di-functional bis(arene)metal compounds is $$(C_6H_5CH_2OH)Cr(C_6H_5COOH)$$

and this compound can be prepared by first carbonating $(C_6H_5MgBr)_2Cr^+Cl^-$ at one —MgBr position, and then reacting with excess formaldehyde to form a halomagnesium methylate at the other —MgBr position. The di-functional bis(arene)chromium compound can be polymerized by esterification with itself, or it can be reacted with hydroxycarboxylic acids or with other difunctional compounds to prepare polymers.

The bis(arene)metal compounds containing one or more aryl carbinol groups, such as

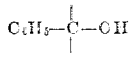

can be used to form end groups of various polyesters, or as components in various polyesters in a manner analogous to that described above for compounds containing one or more $C_6H_5COOH$ groups; the carbinol group, of course, will esterify the carboxyl groups of the polyester or the acid components thereof.

The various functional-group-containing bis(arene)-metal compounds will also have various biological and toxicological uses, and their functional groups will make it possible to convert the compounds to various forms for such applications; the stated bis(arene)compounds will also be useful as polymerization catalysts for the polymerization of various monomers, particularly vinyl monomers, e.g., ethylene; the stated compounds can also be used for metal plating e.g., chrome plating, of metals or other materials by employing the plating procedures set forth in my copending application Serial Number 616,224.

The preparation and Grignard reactions of bis(arene)-metal Grignard reagents have been described; the utility and properties of compounds resulting from such Grignard reactions have also been described.

I claim:

1. The process of reacting a bis(arene)metal complex of an individual group VI transition metal in which the arene groups contain Grignard metallo halo substitution selected from the group consisting of magnesium halide substituents and metal halide substituents in which the metal of said metal halide is the same as the aforesaid individual group VI transition metal in a Grignard reaction, under Grignard conditions, with a compound capable of undergoing a useful additive reaction with a Grignard reagent hydrolyzing the resulting complex, and obtaining a bis(arene)metal compound in which metallo halo substitution has been replaced by a residue of said compound capable of undergoing a useful additive reaction with a Grignard reagent.

2. The process of claim 1 in which the reaction involves addition to carbon-to-oxygen double bonds.

3. The process of claim 1 in which the reaction involves oxidation of a metallo halo substituent to obtain an —OH group.

4. The process of reacting a bis(arene)chromium complex obtained by reacting aryl magnesium halide Grignard reagent with chromium halide in a Grignard solvent at a relatively low temperature, and containing Grignard metallo halo substitution selected from the group consisting of chromium halide and magnesium halide substituents on arene groups, with an organic compound containing a carbon-to-oxygen double bond, in a Grignard solvent under Grignard conditions, hydrolyzing the resulting complex and obtaining the resulting bis(arene)-chromium compounds in which arene groups comprise aryl groups attached to a residue of the said organic compound at the carbon atom which was originally bound to oxygen by a carbon-to-oxygen double bond.

5. A method of preparing bis(arene)metal compounds in which there are reactive functional groups in at least one of the arene groups, which comprises reacting an aryl magnesium halide Grignard reagent with a halide of an individual metal of group VI of the periodic chart of the elements, and adding to the resulting bis(arene)-metal complex of an individual group VI transition metal in which the arene groups contain Grignard metallo halo substitution selected from the group consisting of magnesium halide substituents and metal halide substituents in which the metal of said metal halide is the same as the aforesaid individual group VI transition metal, a compound capable of undergoing a useful additive reaction with a Grignard reagent, and then hydrolyzing to obtain a bis(arene)metal compound in which at least one arene group is attached to a residue of said compound capable of undergoing a useful additive reaction with a Grignard reagent.

6. The method of claim 5 in which the Grignard reagent is $C_6H_5MgBr$ and the metal halide is selected from the group consisting of chromic chloride and chromyl chloride.

7. The method of claim 6 in which the said resulting complex is treated with carbon dioxide at atmospheric pressure and an initial temperature no greater than 10° C., followed by hydrolysis with aqueous sodium hydroxide to produce a compound having a $C_6H_5COONa$ group.

8. A method of preparing bis(arene)chromium compounds in which at least one of the arene groups has a carboxy substituent, which comprises carbonating a bis(arene)chromium complex obtained by reacting aryl magnesium halide Grignard reagent with chromium halide in a Grignard solvent at relatively low temperature and in which at least one of the arene groups has Grignard metallo halo substitution selected from the group consisting of chromium halide and magnesium halide substituents and hydrolyzing to obtain the resulting bis(arene)chromium compound containing carboxy substitution.

9. The method of claim 8 in which Dry Ice is used for the carbonation.

10. The method of claim 8 in which carbon dioxide is slowly passed through an ethyl ether solution of the said bis(arene)chromium complex.

11. The method of preparing a bis(arene)chromium compound in which at least one aryl group is attached to a carbinol group which comprises reacting a bis-(arene)chromium complex prepared by reacting an aryl magnesium halide Grignard reagent with a chromium halide selected from the group consisting of chromic trichloride and chromyl chloride, with an organic compound selected from the group consisting of aldehydes and ketones of no more than eight carbon atoms under Grignard conditions, hydrolyzing the resulting complex and adding dilute acid, and isolating the resulting bis(arene)-chromium compound which contains at least one aryl carbinol moiety.

12. A bis(arene)chromium compound in which at least one of the arene groups contains a carboxyl substituent.

13. As a new compound, the compound represented by the formula:

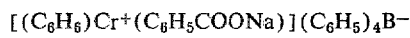

14. A bis-(arene)metal chromium compound in which at least one of the arene groups is an aryl carbinol.

15. A bis(arene)chromium compound in which at least one of the arene groups is phenylmethanol.

16. A bis(arene)chromium compound in which at least one of the arene groups is phenol.

17. A bis-(arene)metal chromium compound in which at least one of the arene groups contains a reactive oxygen-containing substituent selected from the group consisting of hydroxyl and carboxyl.

References Cited in the file of this patent

Cotton: Chemical Reviews, vol. 55, February–June, 1955, pp. 563–570.

J.A.C.S., vol. 78, No. 22, Nov. 20, 1956, p. 5959.

Fieser et al.: Organic Chemistry, 1944, pp. 667–668.

UNITED STATES PATENT OFFICE
CERTIFICATE OF CORRECTION

Patent No. 3,104,250 September 17, 1963

Harold H. Zeiss

It is hereby certified that error appears in the above numbered patent requiring correction and that the said Letters Patent should read as corrected below.

Column 3, line 52, the formula should appear as shown below instead of as in the patent:

column 4, lines 70 to 75, for the bottom portion of the formula reading "$(C_3H_5)$" read -- $(C_2H_5)$ --; column 7, line 13, for "yelow" read -- yellow --; column 15, line 60, for "corboxyl" read -- carboxyl --; column 18, lines 55 and 61, strike out "metal", each occurrence.

Signed and sealed this 31st day of March 1964.

(SEAL)
Attest:

ERNEST W. SWIDER
Attesting Officer

EDWARD J. BRENNER
Commissioner of Patents